United States Patent [19]
Hotta

[11] 4,249,392
[45] Feb. 10, 1981

[54] CONSTANT TEMPERATURE BOX

[75] Inventor: Masashi Hotta, Osaka, Japan

[73] Assignee: Shimano Industrial Company, Limited, Osaka, Japan

[21] Appl. No.: 41,479

[22] Filed: May 22, 1979

[30] Foreign Application Priority Data

May 22, 1978 [JP] Japan .............................. 53-69270[U]
May 22, 1978 [JP] Japan .............................. 53-69271[U]

[51] Int. Cl.³ .......................... F25D 3/08; F25D 3/10; B67D 5/60; B67D 5/64
[52] U.S. Cl. ....................................... 62/457; 62/371; 62/529; 222/131
[58] Field of Search ................ 62/457, 371, 372, 396, 62/529; 222/146 R, 146 C, 131

[56] References Cited

U.S. PATENT DOCUMENTS

| | | | |
|---|---|---|---|
| 3,069,869 | 12/1962 | Mueller | 62/457 |
| 3,255,607 | 6/1966 | Bair et al. | 62/457 X |
| 3,395,550 | 8/1968 | Dungan | 62/371 |
| 3,665,728 | 5/1972 | Stoller | 62/457 X |
| 4,024,731 | 5/1977 | Branscum | 62/457 |
| 4,078,701 | 3/1978 | Clubb | 62/372 X |
| 4,162,029 | 7/1979 | Gottsegen | 222/131 |

Primary Examiner—Lloyd L. King
Attorney, Agent, or Firm—Stevens, Davis, Miller & Mosher

[57] ABSTRACT

A constant temperature box is disclosed comprising a body which is open at one side thereof having a lid for closing the open side of the body, the body and lid being of adiabatic construction. The box has incorporated therewith a container filled with a beverage which serves as a cooling or heating source to thereby cool or warm foodstuffs and beverages kept within a space inside the body, the beverage being readily discharged from the container by means of a valve or air pump.

11 Claims, 7 Drawing Figures

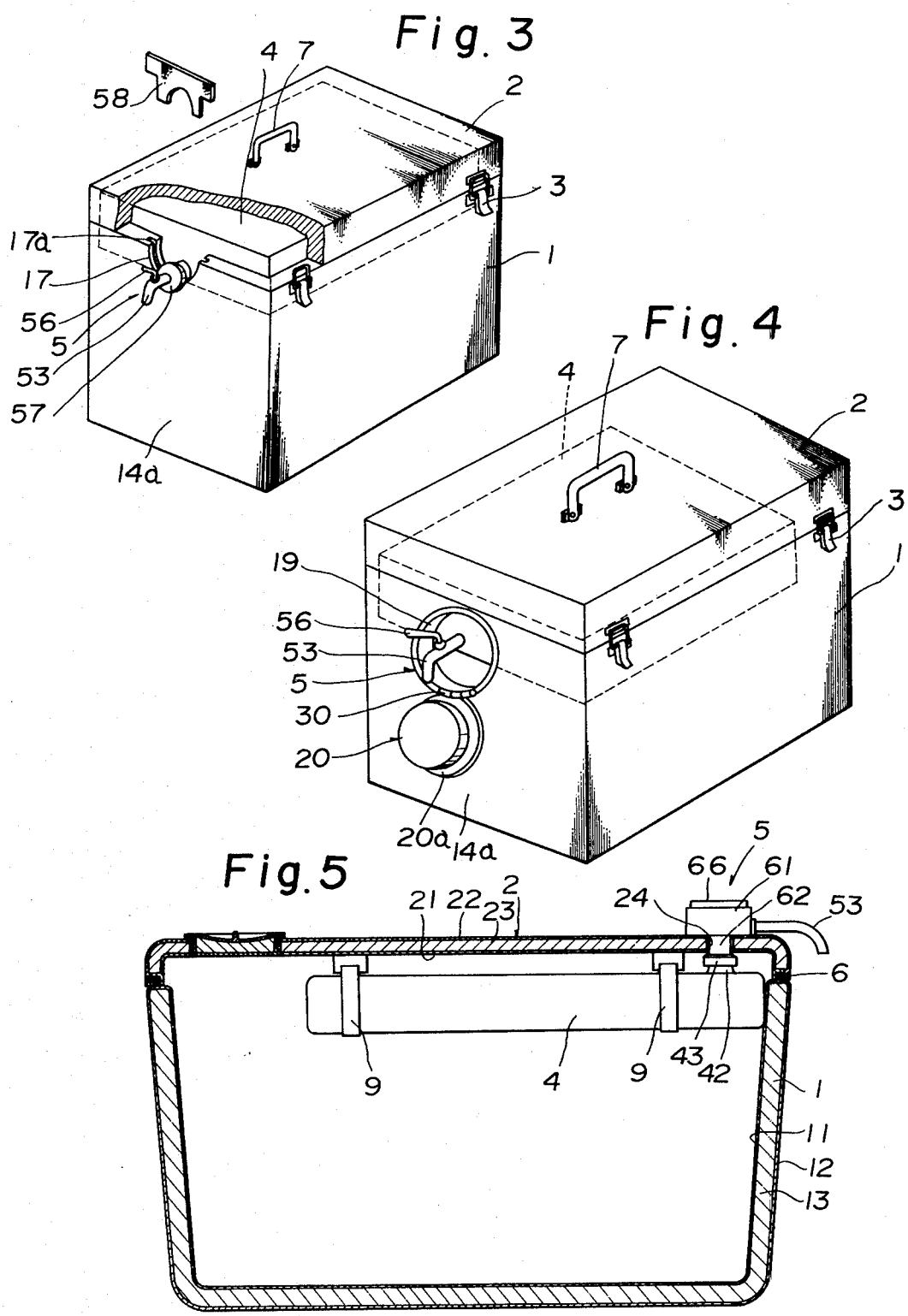

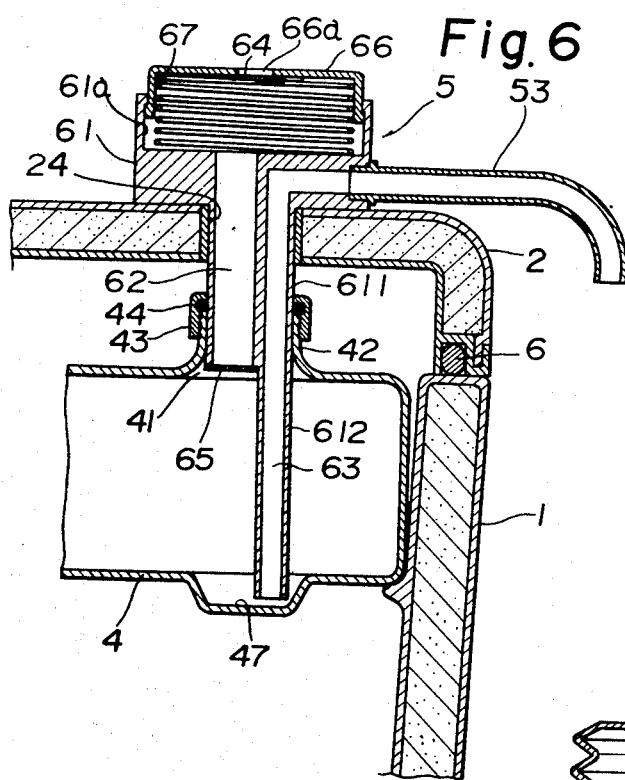
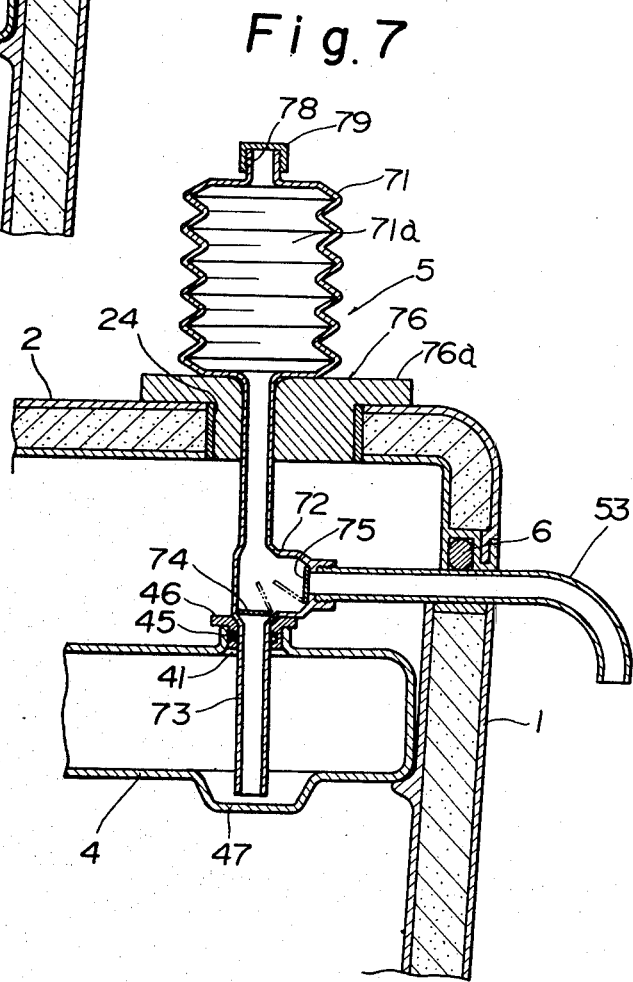

CONSTANT TEMPERATURE BOX

This invention relates to a constant temperature box, and more particularly to a constant temperature box which is portable for storing foodstuffs and beverages, such as fruits, canned beer or caught fish which are to be cooled, or alternatively lunches or tea to be warmed, by a cooling or heating source within the box.

A cooler and a constant temperature box are well-known, the cooler keeping therein foodstuffs and beverages at a low temperature, the constant temperature box, like a jar, being of adiabatic construction with double glass walls having a vacuum therebetween so that the contents of the box may be kept cool or warm within the inner glass wall.

The cooler has a body and lid made from insulating material, such as polyurethane, so that the lid may tightly close the interior of the body. Foodstuffs and beverages together with ice are kept within the cooler, the ice being used as a cooling source.

When used as the cooling source, the ice melts and collects as water in the bottom of the cooler after the lapse of time, which is undesirable for the foodstuffs and beverages, especially fish which are to be kept cool, because they are likely to discolor or degenerate when in contact with the water.

On the other hand, the constant temperature box has more of an adiabatic effect than the cooler to thereby keep the contents cool or warm for a long period of time. The box is complicated in construction and is expensive when made large-sized for holding a large quantity of foodstuffs and beverages. Further, the box has the disadvantage of having breakable glass walls.

In view of the aforesaid problems, this invention has been designed. A main object of the invention is to provide a constant temperature box having a simple construction, inexpensive to produce, unbreakable even with rough handling, and capable of cooling or warming foodstuffs and beverages while maintaining the quality thereof for a long time.

Another object of the invention is to provide a constant temperature box capable of using a beverage as a cooling or heating source to cool or warm foodstuffs and beverages stored within the box, and being capable of readily discharging the cooling or heating source from the box which may thereafter be used for drinking.

In other words, the constant temperature box of the invention comprises a body open at one side and a lid for sealing the open side of the body, both the body and lid being of adiabatic construction. The body has incorporated therewith a container for retaining a beverage which serves as a cooling or heating source to thereby cool or warm foodstuffs and beverages received in a space within the body, and discharge means are provided comprising a valve or air pump for discharging the cooling or heating source from the container.

The container for the cooling or heating source comprises a hollow and sealed container formed of a heat resistant and heat transferable material, such as synthetic resin or aluminum alloy. The container is capable of being filled with a beverage serving as the cooling or heating source, and is shaped as a whole like a heat box. At one side of the container is provided a port through which the beverage is added or removed from the container.

The container for the source of cooling or heating is disposed upward from the space within the body and supported by support means provided at the body or lid so that the discharge means attached to the port may discharge the beverage from the container without opening the lid.

The discharge means includes a valve mounted to the port with an air pump mounted thereto. The valve and pump each have a discharge pipe for discharging the beverage from the container, the discharge pipe being exposed or capable of being exposed outwardly from the body or lid so that the valve and pump are controlled to discharge the beverage when the lid is shut.

The beverage in the container is usually water. When used as a cooling source, the water is poured into the container through the port after removing the discharge means, and the container is usually put into a domestic refrigerator to freeze the water. On the other hand, when used as a heating source, the water is preheated at a high temperature and poured into the container through the port.

The container for the cooling or heating source according to the aforegoing, is incorporated with the box body, whereby cool or warm air derived from the beverage circulates by convection within the body to cool or warm the entire contents. The beverage within the container at the conclusion of cooling or warming the contents, can readily be removed for drinking purposes.

DESCRIPTION OF THE DRAWINGS

These and other objects and novel features of the invention will be more apparent from the following description concerning embodiments of the invention in accordance with the accompanying drawings, in which:

FIGS. 3 and 4 are perspective views of improvements of the first embodiment.

FIG. 5 is a longitudinally sectional view of a second embodiment.

FIG. 6 is an enlarged sectional view of the principal portion of the second embodiment.

FIG. 7 is an enlarged sectional view of the principal portion only of an improvement of the second embodiment.

DESCRIPTION OF THE PREFERRED EMBODIMENT

Figure 1:
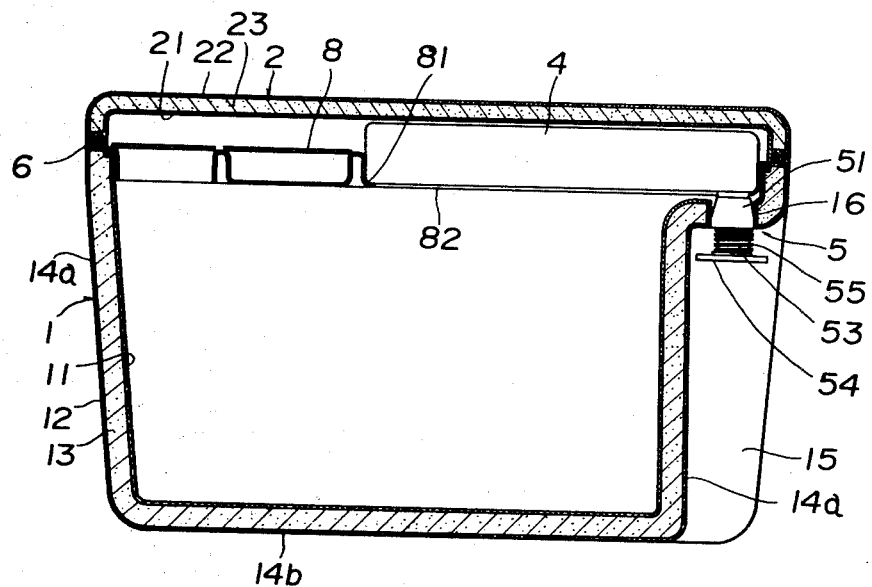
FIG. 1 is a longitudinally sectional view of a first embodiment of the invention, showing a closed lid.

The constant temperature box of the invention generally comprises; a body 1 opening upwardly and having an inner space for receiving of foodstuffs and beverages a lid 2 closing the upper opening of body 1; clasps 3 for tightly closing tight the lid 2 to the body 1; a container 4 of cooling or heating source, which is inserted into the body 1 and is capable of receiving a beverage within the same; and a discharge means 5 for discharging the beverage from the container 4.

The box body 1, as shown in FIG. 1, comprises an inner body 11 of stainless steel, an outer body 12 of synthetic resin, and an insulating material 13, such as polyurethane or foamed polystyrene resin, inserted between the inner and outer bodies 11 and 12. The body 1 has two pairs of side walls 14a each pair of which are opposite and a bottom wall 14b, and an upward opening.

The lid 2 has a shallow dish-like shape and comprises an inner and outer body 21 and 22 made of synthetic resin and an insulating material 23 is inserted therebetween. The lid 2 is supported to the upper portion of one side wall 14a at the body 1 by means of hinges (not shown) in a relationship for opening and shutting. The lid 2 is also surrounded at the edge thereof with packing 6 through which the lid 2 is shut to hermetically seal the interior of the body 1. The clasps 3 are provided between the body 1 and the lid 2 and a grip 7 for carrying the box is attached to the lid 2 as shown in FIGS. 3 and 4.

For carrying the box, the grip 7 may be replaced by a band attached to a pair of opposite side walls at the body 1.

The container 4 having the cooling or heating source comprises a hollow and sealed container of synthetic resin, or an aluminum alloy which is heat resistant and heat transferable. The container 4 can receive therein a beverage as the cooling or heating source, is smaller in size than the upper opening of body 1 so as to be suspended in the upper portion of the space, and is comparatively small in thickness and may be formed in a flat-wall-like shape. At the upper or lower surface of the container 4 is provided a port 41 through which the beverage is either added or removed from the container 4.

When the container 4 is used as the cooling source, water is poured into the container 4 through the port 41 and frozen with, for example, a domestic refrigerator. Water is preheated at high temperature and poured into the container 4 through the port 41 when the container 4 is used as a heating source.

The container 4 is suspended upwardly from the space within the body 1 by being attached to the upper portion of body 1 as shown in FIG. 1. or the inner surface of lid 2 as shown in FIG. 5.

When the body 1 has at the upper portion thereof an inner cover 8 as shown in FIG. 1, support means for supporting the container 4 to the body 1 comprises a window 82 with holders 81 by which the container 4 is detachably supported. When the body 1 has no inner cover, projections are provided at the upper portions of the inner surfaces of side walls 14a at the body 1 to thereby detachably support the container 4.

On the other hand, the support means for supporting the container 4 to the lid 2 uses a band 9 which is fixed to the inner surface of lid 2 to thereby detachably support the container 4 as shown in FIG. 5.

The discharge means 5 for discharging the beverage from the container 4 uses a valve having a discharge pipe as shown in FIGS. 1 through 4, or an air pump as shown in FIGS. 5 through 7.

Figure 2:
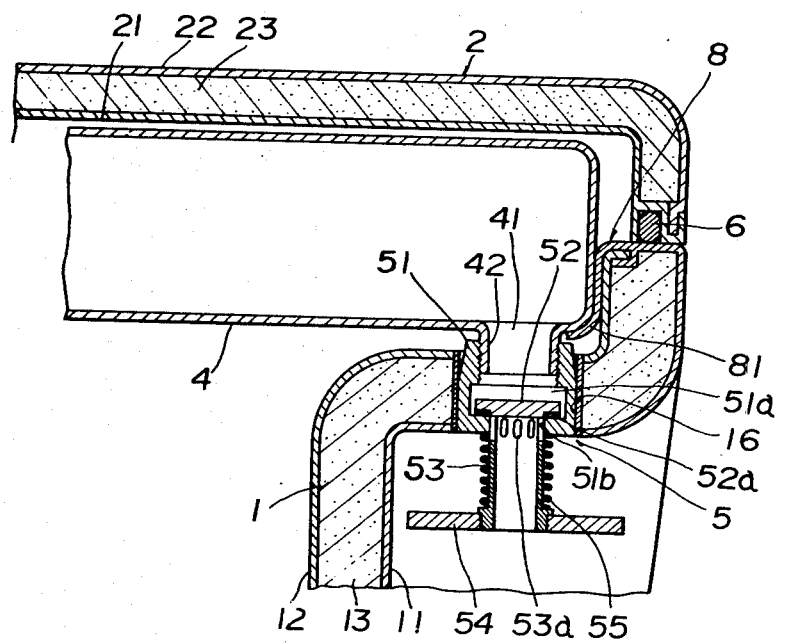
FIG. 2 is an enlarged sectional view of a principal portion of the first embodiment of FIG. 1.

At first, a first embodiment of the invention employing the valve will be detailed in accordance with FIGS. 1 and 2.

The valve is shown which comprises a cylindrical valve body 51 having a valve chest 51a and an outlet 51b communicating therewith, a valve plate 52 housed movably within the valve chest 51a and serving to open or close the outlet 51b, a discharge pipe 53 fixed to the valve plate 52, and a control panel 54 attached to the discharge pipe 53. The valve body 51 is detachably mounted by screw means to a mounting cylindrical member 42 extending downwardly from the port 41 provided at the lower surface of container 4.

The valve plate 52 has annular packing 52a in close contact with a valve seat formed around the outlet 51b of valve body 51. A number of bores 53a for allowing the discharge pipe 53 to communicate with the valve chest 51a are provided at the upper portion of discharge pipe 53 and in the vicinity of the joint of valve plate 52 therewith. A coiled spring 55 is inserted between the lower surface of valve body 51 and the lower portion of discharge pipe 53 near the control panel 54 to thereby bias the valve plate 52 to always close the outlet 51b. The control panel 54 is disc shaped and made slightly larger in diameter than a drinking glass.

The discharge means 5 constructed according to the foregoing is mounted to the container 4 in such a manner that at an intermediate portion of the width of one side wall 14a of the box body 1 vertically extending a recess 15 is provided. At the upper wall of recess 15 through hole 16 is provided and the valve body 51 is inserted therein as shown in FIGS. 1 and 2, so that the discharge pipe 53 may be positioned within the recess 15 and protrudes outwardly from the box body 1. Hence, the beverage within the container 4 is readily discharged therefrom through the discharge means 5 by holding a glass to the control panel 54 and pushing the panel 54 upward to open the valve plate 52.

Next, the use of the constant temperature box according to the foregoing will be described.

At first, the cooling or heating source container is removed from the box body 1 and filled with a beverage, usually water, through the port 41 which may be frozen by the refrigerator, or alternatively with hot water through the port 41, and then supported to the holder 81 at the inner cover 8 suspended at the upper portion of the body 1. Also, the port 41 at the container 4 is fit to the through hole 16 at the box body 1 and the valve body 51 is inserted from outside the body 1 through the hole 16 and attached to the mounting member 42 at port 41. Hence, the container 4, which contains ice or hot water and is housed within the constant temperature box, keeps the interior of box cool or warm thereby maintaining the foodstuffs and beverages at a low or high temperature.

After frozen water or juice within the container melts or hot water cools, it is discharged for drinking purposes in such a manner that a glass is held to the control panel 54 to move the valve plate 52 upward through the discharge pipe 53, whereby the beverage within the container 4 is discharged therefrom through the port 41, valve chest 51a, outlet 51b and discharge pipe 53, into the glass.

The discharge means 5 at the aforesaid embodiment may be improved as shown in FIGS. 3 and 4.

The discharge means 5 in FIGS. 3 and 4 uses a cock in place of the aforesaid valve. The port 41 is provided at one lateral side of the container 4 and connected with the discharge pipe 53 of a L-like shape and the cock is interposed along the the discharge pipe 53.

The cock is of the same construction as usual, which has a stopcock (not shown) to open or close the fluid passage at the discharge pipe 53 and a control lever 56 for the stopcock.

The cock shown in FIG. 3 is provided in such a manner that; at the upper portion of one side wall 14a of the box body 1 is formed a semicircular cutout 17 with a groove 17a, through which cutout 17 the discharge pipe 53 and control lever 56 are exposed outwardly from the side wall 14a; a flange 57 is provided along the discharge pipe 53, the flange 57 being disposed outside the cutout 17; and a heat resistant shutter 58 is fit into the groove 17a, thereby closing the cutout 17.

The cock shown in FIG. 4 is provided in such a manner that at one side wall 14a of the box body 1 is provided a through hole 19 through which the discharge pipe 53 and control lever 56 are passable, and the container 4 is supported to the body 1 slidably horizontal so that when the beverage is discharged from the container 4 through the discharge pipe 53, the container 4 is pulled toward the one side wall 14a to thereby extend the fore end of discharge pipe 53 and control lever 56 outward of the through hole 19. In this instance, it is convenient to keep the discharge pipe 53, when out of use, within the body 1. In addition, a cap 20 with a flange 20a of adiabatic construction is hinged 30 to the periphery of through hole 19 in order to close or open the hole 19.

Next, the second embodiment employing an air pump as the discharge means 5 will be detailed according to FIGS. 5 through 7.

The air pump in this embodiment is supported mainly to the lid 2 through a through hole 24, in which the container 4 also is supported to the lid 2 and the port 41 is provided at the upper surface of the container 4.

The air pump includes that shown in FIGS. 5 and 6 and that shown in FIG. 7.

The air pump in FIGS. 5 and 6 comprises a pump body 61 having a pumping element, an air passage 62, a pumping-up conduit 63, and two check valves 64 and 65 of leaf-like shape, the pumping-up conduit 63 being detachably connected with the discharge pipe 53.

The pump body 61 is composed mainly of synthetic resin and is provided at the upper portion with a pump box 61a. An operating body 66 a cup shape and with an air intake 66a, is incorporated with the pump box 61a vertically movable through a spring 67, and the check valve 64 is mounted to the air intake 66a, so that the operating body 66 is vertically moved to expand or contract the pump box 61a to perform pumping action. In this embodiment, the pumping element comprises the pump box 61a, operating body 66 and spring 67.

The pump body 61 extends downwardly to form an extension 611 circular in section and at the extension 611 are provided the air passage 62 and pumping-up conduit 63. The upper end of the air passage 62 communicates with the pump box 61a and the lower end of the same is opened at the lower end of extension 611, and the check valve 65 is mounted to the lower opening of air passage 62. The pumping-up conduit 63 which horizontally bends at its upper portion to open at the lateral side of pump body 61, is connected detachably at the end with the discharge pipe 53, and extends at the lower end to form a further extension 612 in continuation of the extension 611, the extension 612 opening below the lower end of air passage 62, whereby when mounting the pump body 61 to the container 4 the lower opening of the pumping-up conduit 63 is positioned near the bottom of container 4.

The air pump according to the foregoing is mounted to the container 4 in such a manner that the extension 611 of pump body 61 perforates the through hole 24 at the lid 2, the pump body 61 is supported to the lid 2, and the extension 611 is fit into the mounting cylindrical member 42 formed at the port 41 of container 4. In addition, the mounting member 42 is preferably screwed with a sealing cap 43 having at its inner periphery an O-ring 44.

The operating body 66 is operated to draw air through the air intake 66a and force the air into the container 4 applying pressure to the interior thereof to thereby pump up the beverage within the container 4 for discharge.

In addition, when the air pump is removed from the container 4, it is preferable to close the through hole 24 at the lid 2 by means of a separate plug (not shown) of adiabatic construction and to form the mounting member 42 at the port 41 to be covered with a cap (not shown).

The aforesaid air pump also may be modified as shown in FIG. 7.

The air pump in FIG. 7 has a pump body 71 which is made of flexible synthetic resin to form a bellows pump box 71a, thereby performing pumping action through expansion and contraction. A valve chest 72 is provided below the pump body 71 and connected to a pipe 73 of the pumping-up conduit and to the discharge pipe 53. Check valves 74 and 75 are provided at the connection of the pumping-up pipe 73 to discharge pipe 53.

When the pump body 71 is supported to the lid 2 and the pipe 73 is inserted into the container 4 through the port 41 thereof, the pipe 73 is so long that the lower end opening thereof approaches the bottom of container 4. The discharge pipe 53 is detachably connected to the valve chest 72 to project externally between the lid 2 and the box body 1.

The pump body 71 is supported to the lid 2 in such a manner that the through hole 24 at the lid 2 is made large enough to allow the valve chest 72 to pass through the hole 24, and the pump body 71 is previously fixed to a base member 76 which is made of insulating material and has a flange 76a for closing tight the through hole 24 so that the base member 76 is insertably supported thereto. The pipe 73 is fit into the mounting cylindrical member 42 at the port 41 of container 4 by use of a sealing cap 46 of an O-ring 45. In addition, in FIG. 7 reference numeral 78 designates an air intake formed at the uppermost end of pump body 71, and 79 indicates a cap closing the air intake 78.

The air pump constructed as aforegoing is used to discharge the beverage from the container 4 by closing the air intake 78 and by expanding and contracting the bellows pump body 71. In detail, the pump body 71, when expanded, acts by suction to apply negative pressure to the interior of container 4 to thereby draw the beverage into the valve chest 72. When contracted, the pump body 1 pumps the beverage out of the valve chest 72 and discharges it through the discharge pipe 53. After the discharge the cap 79 is unscrewed to open the air intake 78, thereby returning the interior of container 4 under to atmospheric pressure.

In the case where the aforesaid air pumps are used as the discharge means 5, it is preferable that the container 4 be provided at the bottom thereof with a recess 47 as shown in FIGS. 6 and 7, so that the aforesaid pumping-up conduit 63 or pipe 73 is allowed to face the recess 47. This permits the beverage within the container 4 to be substantially removed therefrom.

In addition, in the aforesaid second embodiment, when the beverage is poured into the container 4, the air pump is removed from the container 4, but is attached thereto when the beverage is frozen.

As clearly understood from the aforesaid description, the constant temperature box of the invention houses within the inner space at the body thereof, a container filled with a beverage, such as water or juice, to serve as the cooling or heating source to maintain foodstuffs and beverages stored within the box at low or high temperature without discoloration or degeneration. Furthermore, by use of the discharge means, the beverage within the container is readily dischargeable therefrom without opening the lid of the box, and is available for drinking after cooling or warming the contents of the box.

As many apparently widely different embodiments of this invention may be made without departing from the spirit and scope thereof, it is to be understood that the invention is not limited to the specific embodiments thereof except as defined in the appended claims.

What is claimed is:

1. A constant temperature box being portable and capable of receiving therein foodstuffs and beverages and maintaining them at a constant temperature, said box comprising:
    (a) a body of adiabatic construction having an inner space for receiving foodstuffs and beverages, and having an open side;
    (b) a lid of adiabatic construction for sealing said opening of said body, said lid maintaining said inner space air tight;
    (c) clasps for holding said lid to said body;
    (d) a cooling or heating source detachably supported within said space at said body, said source comprising a hollow and sealed container capable of keeping therein a beverage for cooling or heating, said container having a port through which said beverage is added and removed;
    (e) support means for detachably supporting said container arranged at the upper portion of said space within said body, and
    (f) discharge means having an inlet which communicates with said port of said container when said container is on said support means and serving to discharge from said container said beverage, said discharge means having a discharge pipe, said discharge pipe projecting from said body or lid so that said beverage may be discharged from said container when said lid is shut.

2. A constant temperature box according to claim 1, wherein said discharge means comprises a valve having a discharge pipe and said support means is provided at said body.

3. A constant temperature box according to claim 2, wherein said valve comprises a cock having a stopcock interposed along said discharge pipe to close or open the fluid passage thereof and an operating lever for operating said stopcock, and said discharge pipe is connected at a first end thereof with a port provided at the lower portion of said container and is exposed at a second end together with said operating lever outwardly of said body.

4. A constant temperature box according to claim 3, wherein said body includes a through hole through which said cock is passable and a cap being of adiabatic construction serving to open or close said through hole, said container being supported movably horizontal to the upper portion of said body so that said cock attached to said container may be pulled outwardly from said body through said through hole.

5. A constant temperature box according to claim 2, wherein said valve comprises a cylindrical valve body having an outlet and a valve chest connected with said port at said container, a valve plate housed within said valve chest at said valve body so as to open or close said outlet, a discharge pipe extending from said valve plate, and a control panel attached to said discharge pipe; said port of said container being positioned at the lower surface of said container; and said valve is attached to said port so that said discharge pipe may be directed vertically to said container.

6. A constant temperature box according to claim 5, wherein between said valve body and said discharge pipe or control panel fixed thereto is inserted an elastic member, said elastic member biasing said valve plate to close said outlet.

7. A constant temperature box according to claim 1, wherein said discharge means is an air pump.

8. A constant temperature box according to claim 7, wherein said air pump is mounted to said lid, said lid having said support means for said container of cooling or heating source.

9. A constant temperature box according to claim 8, wherein said port is provided at the upper surface of said container of cooling or heating source; said air-pump comprising a pump body having a pumping element, an air passage connected to said pumping element at said pump body, and a pumping-up conduit; said discharge pipe being connected to said pumping-up conduit at a side of an outlet thereof; said air passage and pumping-up conduit at a side of an inlet thereof being connected to said port; and said pumping-up conduit is opened at the bottom of said container so that said pumping element is operated to feed air into said container through said air passage to apply pressure to the interior of said container, thereby discharging said beverage from said container through said discharge pipe.

10. A constant temperature box according to claim 9, wherein said pumping element is provided with an operating body and a spring, so that said operating body is operated to feed air into said container through said air passage to apply pressure to the interior of said container, thereby discharging said beverage from said container through said discharge pipe.

11. A constant temperature box according to claim 8, wherein said container of cooling or heating source has at the upper surface thereof said port, said air pump is provided with a pump body having a pump box capable of acting in expansion and contraction and a valve chest, and with a pipe connected to said valve chest, said discharge pipe being connected to said valve chest, and said pipe connected to said valve chest is open at the bottom of said container, so that said pump body acts in expansion and contraction to apply negative pressure to the interior of said container to thereby suck up said beverage kept within said container and discharge said beverage therefrom through said discharge pipe.

* * * * *